(12) United States Patent
Marsetti et al.

(10) Patent No.: US 12,459,744 B2
(45) Date of Patent: Nov. 4, 2025

(54) MODULE FOR A MODULAR CONVEYOR BELT AND CONVEYOR BELT COMPRISING SAID MODULES

(71) Applicant: MOVEX S.P.A., Castelli Calepio (IT)

(72) Inventors: Sergio Marsetti, Paradiso (CH); Matteo Marsetti, Telgate (IT)

(73) Assignee: MOVEX S.P.A., Castelli Calepio (IT)

( * ) Notice: Subject to any disclaimer, the term of this patent is extended or adjusted under 35 U.S.C. 154(b) by 304 days.

(21) Appl. No.: 18/140,679

(22) Filed: Apr. 28, 2023

(65) Prior Publication Data

US 2023/0348194 A1 Nov. 2, 2023

(30) Foreign Application Priority Data

Apr. 29, 2022 (IT) .................. 102022000008567

(51) Int. Cl.
*B65G 17/06* (2006.01)
*B65G 17/08* (2006.01)

(52) U.S. Cl.
CPC .......... *B65G 17/08* (2013.01); *B65G 2207/30* (2013.01)

(58) Field of Classification Search
CPC ..... B65G 17/06; B65G 17/08; B65G 2207/30
USPC ........................................................ 198/853
See application file for complete search history.

(56) References Cited

U.S. PATENT DOCUMENTS

| | | | | |
|---|---|---|---|---|
| 4,438,838 A * | 3/1984 | Hodlewsky | ............ | B65G 17/08 198/853 |
| 4,893,710 A * | 1/1990 | Bailey | ............ | B65G 17/08 198/853 |
| 5,121,831 A * | 6/1992 | Fesler | ............ | B65G 17/38 198/853 |
| 5,123,524 A * | 6/1992 | Lapeyre | ............ | B65G 17/08 198/853 |
| 5,181,601 A * | 1/1993 | Palmaer | ............ | B65G 17/086 198/852 |
| 5,215,185 A * | 6/1993 | Counter | ............ | B65G 17/08 198/853 |
| 6,050,397 A * | 4/2000 | Kato | ............ | B65G 17/46 198/853 |
| 6,471,049 B1 | 10/2002 | van Esch | | |

(Continued)

FOREIGN PATENT DOCUMENTS

GB 778509 A 7/1957

*Primary Examiner* — Douglas A Hess (74) *Attorney, Agent, or Firm* — Dickinson Wright PLLC; Andrew D. Dorisio (57) ABSTRACT

A module for a modular conveyor belt includes interconnected modules with front and rear projecting elements having an outermost convex surface and forming at least one circular arc-shaped portion, with the centres at the same vertical distance from the lower surface and at the same horizontal distance from the outermost portion, and a plurality of raised elements departing from a first upper surface of a base element or from the upper portions of coupling elements and a plurality of recesses which separate the raised elements, each having an upper bearing surface for transporting the products, a difference between the vertical distance the centres of the circular arc-shaped portions of the outermost convex surfaces of the rear and front projecting elements, and the vertical distance of the centres of the holes in the rear and front projecting elements, is greater than or equal to 1 mm.

13 Claims, 8 Drawing Sheets

(56) References Cited

U.S. PATENT DOCUMENTS

| | | | |
|---|---|---|---|
| 8,430,235 B2* | 4/2013 | Menke | B65G 17/08 |
| | | | 198/853 |
| 8,678,180 B2* | 3/2014 | Marshall | B65G 17/24 |
| | | | 198/779 |
| 9,340,359 B2* | 5/2016 | Bettati | B65G 15/32 |
| 9,969,556 B2* | 5/2018 | Andersen | B65G 17/40 |
| 10,301,116 B2* | 5/2019 | Bulsink | B33Y 80/00 |
| 2010/0044191 A1 | 2/2010 | Van Rees | |
| 2010/0175969 A1* | 7/2010 | Marsetti | |

* cited by examiner

MODULE FOR A MODULAR CONVEYOR BELT AND CONVEYOR BELT COMPRISING SAID MODULES

This application claims priority to Italian Patent Application No. 102022000008567 filed on Apr. 29, 2022, the disclosure of which is incorporated herein by reference.

TECHNICAL FIELD

The present invention relates to a module for a modular conveyor belt and a conveyor belt comprising said modules, according to the pre-characterizing part of the independent claims.

BACKGROUND

In the field of modular conveyors, modular chain conveyors and modular belt conveyors are known; these are conveyors which have very different structural features.

As known to the person skilled in the art, both modular chain conveyors and modular belt conveyors have modules each having a body comprising:
  an upper flat bearing surface for bearing the products to be transported,
  a lower flat surface opposite and parallel to said upper surface,
  a front edge and a rear edge parallel to each other, which delimit the length of the module and comprise connecting element, adapted to connect one module to the one that immediately follows,
  and two lateral edges parallel to each other which delimit the width of the module.

In the modules of the modular chain conveyors, the connecting elements for connecting one module with the one that immediately follows only extend in a central part of the front and rear edges of the body of each module and extend downwards only in a central part of the lower flat surface, which therefore has a central portion from which the connecting elements protrude downwards having a first height and flat lateral parts free from the connecting elements, which as discussed below, are the parts that slide on the support and guide elements of the modular chain conveyor.

GB778509 describes a modular chain conveyor.

Due to the particular shape and positioning of the connecting elements, the modular chain conveyors slide on sliding paths dedicated to this type of conveyors, which include two parallel and spaced tracks:
  the flat lateral parts of the lower surface of the modules, that is to say the parts of the lower surface of the modules which are free from the connecting elements, are adapted to slide along the upper surface of the tracks,
  while the central part of the connecting elements, which protrudes towards the bottom of the lower surface of the modules, is adapted to move in the space between said two tracks, the side walls of the connecting elements projecting downwards being able to come into contact with the opposite side walls of the tracks and a bottom part of these connecting elements not being adapted to slide on any portion of the frame which forms the sliding paths.

It should be noted that thanks to the positioning of the connecting elements only in the central part of the front and rear edges and the lower surface of the modules of the chain conveyors, these central parts of the modules are the ones most stressed by the forces generated by the connection of the modules to each other, while the sliding parts of the modules are less stressed.

The modular chain conveyor described in GB778509 is supported by and slides on a sliding path including two tracks, like the one described above.

In cases where modular chain conveyors having a width greater than that of the modules are to be built up, it is usual to place several conveyors side by side with the lateral edges of a conveyor in contact with or slightly spaced from those of the adjacent conveyor, so as to create a bearing surface for the greater products to be transported, and in which the connecting pins of the modules of each conveyor only connect the modules of a conveyor together but not also the modules of adjacent conveyors.

The modules of the modular belt conveyors have: a lower flat sliding surface which extends from one to the other of the lateral edges of the modules for cooperation with a flat transport path.

In the modules of the modular belt conveyors the connecting elements for connecting a module with the immediately following one:
  are distributed along the entire width (with reference to the belt conveyor sliding direction) of said front and rear edges of the modules,
  have an additional lower flat sliding surface for cooperation with said flat transport path,
  and this additional lower flat sliding surface of said front and rear coupling elements joins and is coplanar with the lower flat sliding surface of the base element to form a single flat sliding surface for cooperation with said flat transport path, and which extends from one to the other of said lateral edges of the modules.

U.S. Pat. No. 6,471,049 describes a modular belt conveyor and more particularly a belt conveyor of the "raised rib" type since the upper flat bearing surface for the products to be transported of each module is not a continuous flat surface but a flat surface formed by the upper flat surfaces of a plurality of raised elements spaced apart from each other.

Due to the particular shape and positioning of the connecting elements, the modular belt conveyors slide on sliding paths dedicated to this type of conveyors, which include a flat sliding surface on which the entire lower surface of the modules, including the lower surface of the connecting elements, slides.

One or more flaps depart downwards from the lower surface of the modules and/or the lateral edges adapted to engage in a guide of the sliding surface and adapted to guide the belt conveyor along the direction defined by the sliding surface.

The modular belt conveyor described in U.S. Pat. No. 6,471,049 is supported and slides on a sliding path having a flat continuous rectilinear surface, and has flaps which depart downwards from the lateral edges of each module, and adapted to engage with the lateral edges of the sliding path so as to guide the belt conveyor along the rectilinear direction in which the path extends.

Several modules in a side-by-side relationship and intercoupled by a hinge pin having the desired width are usually used to build up modular belt conveyors, if so desired, having a width greater than that of the modules of a single belt conveyor. Consequently, it is possible and usual to build up conveyors even having very considerable widths by using the modules for belt conveyors.

The technical problem solved by the modular chain conveyor described in GB778509 is to provide coupling parts for coupling one module with the other which allow to reduce the possibility that small glass fragments could damage the modules. For this purpose, the coupling parts for coupling the modules are designed to minimize this risk of damage. The modules, therefore, are arranged not only to prevent practically all but the smallest fragments of glass or other foreign material from entering, but they are also built up to remove any small fragment or particle that might be found between the coupling parts for coupling the modules. To solve this technical problem each of the modules of the modular chain conveyor described in GB778509 includes three front and two rear connecting elements, wherein the two outermost front connecting elements of the three front connecting elements and the two rear connecting elements have an elliptical cross-sectional shape, and comprise:

a lower portion having a semicircular cross-sectional shape with first centres corresponding to the centres of the holes of the connecting elements for housing the hinge pins for hinging the modules together;

and an upper portion having a semicircular cross-sectional shape with the radius equal to that of the semicircles of the lower portions but with second centres vertically displaced above said first centres.

The central connecting element of the three front connecting elements has a semicircular cross-sectional shape and a single centre corresponding to the centre is of the hole of the front connecting elements for housing the hinge pins for hinging the modules together.

The module of the modular chain conveyor described in GB778509 also has a rib at the bottom which includes a lower flat surface which joins a lower end portion of the two rear connecting elements and only a lower end portion of the central connecting element of the three front connecting elements. This rib lower surface is not a sliding surface for the modular chain conveyor which, it being a chain, instead provides, as usual for this type of conveyors, that the sliding surfaces are the flat lateral parts, to the right and left of the connecting elements, of the lower surface of the modules.

SUMMARY

The object of the present invention is to provide a module for a modular conveyor belt and a modular conveyor belt comprising said modules, alternative to the existing ones and which has optimal resistance characteristics to the usual stresses to which said belts are subjected, in particular at the area of the modules where the hinge pins of the modules are housed.

A further object is to provide a module for a modular conveyor belt and a modular conveyor belt comprising said modules which allows to improve the extension and continuity of the surface for supporting the transported products.

A further object is to provide a module for a modular conveyor belt and a modular conveyor belt comprising said modules which has optimal flexion characteristics of the "back flex" type in a belt using these modules.

These and other objects, which will be evident to the person skilled in the art, are achieved by a module for a modular conveyor belt and a modular conveyor belt according to the characterizing part of the attached claims.

BRIEF DESCRIPTION OF THE DRAWINGS

For a better understanding of the present invention, the following drawings are attached purely by way of not-limiting example, in which.

DETAILED DESCRIPTION

Figure 1:
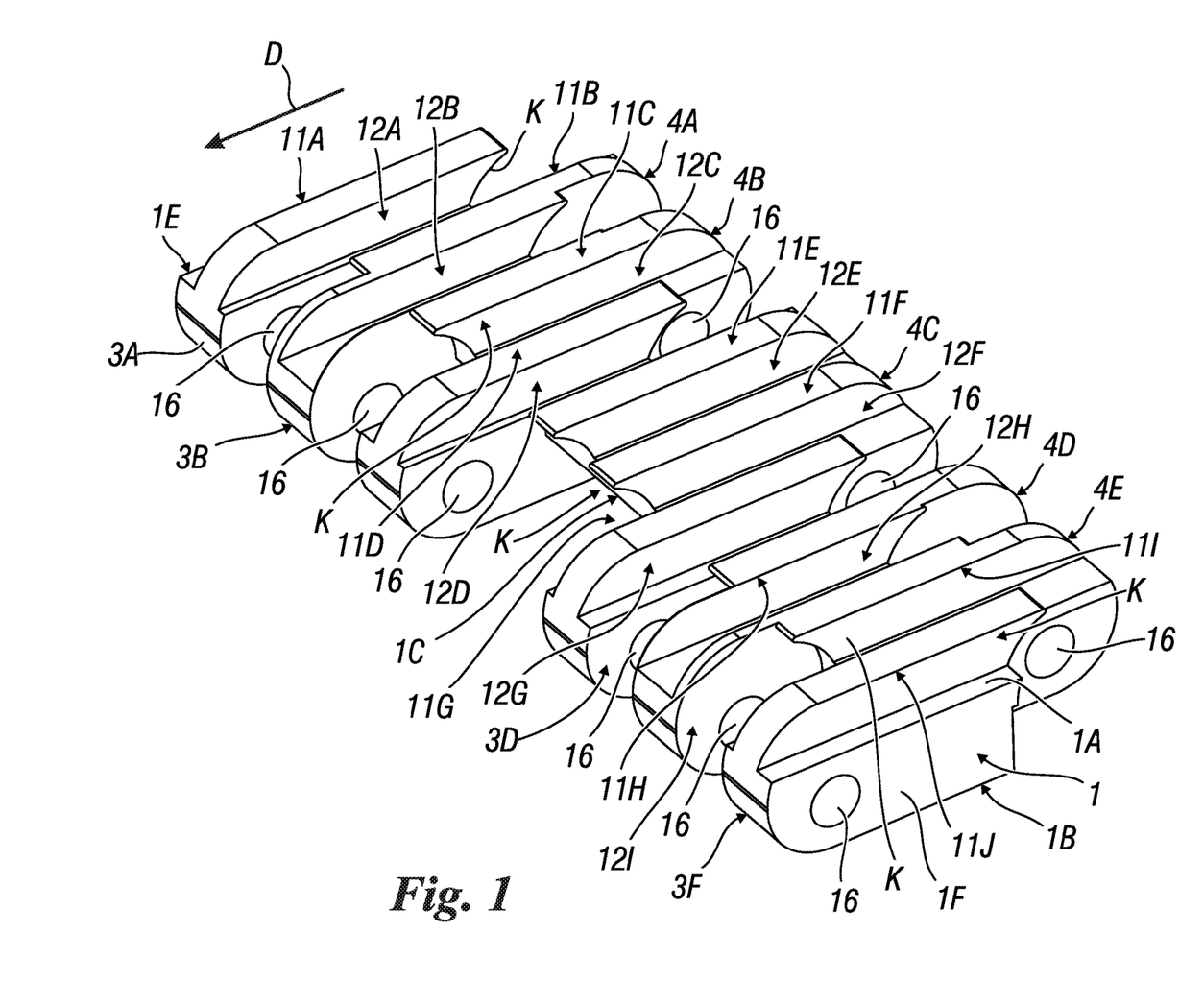
FIG. 1 is a schematic top perspective view of the module for a modular conveyor belt according to the invention.
Figure 2:
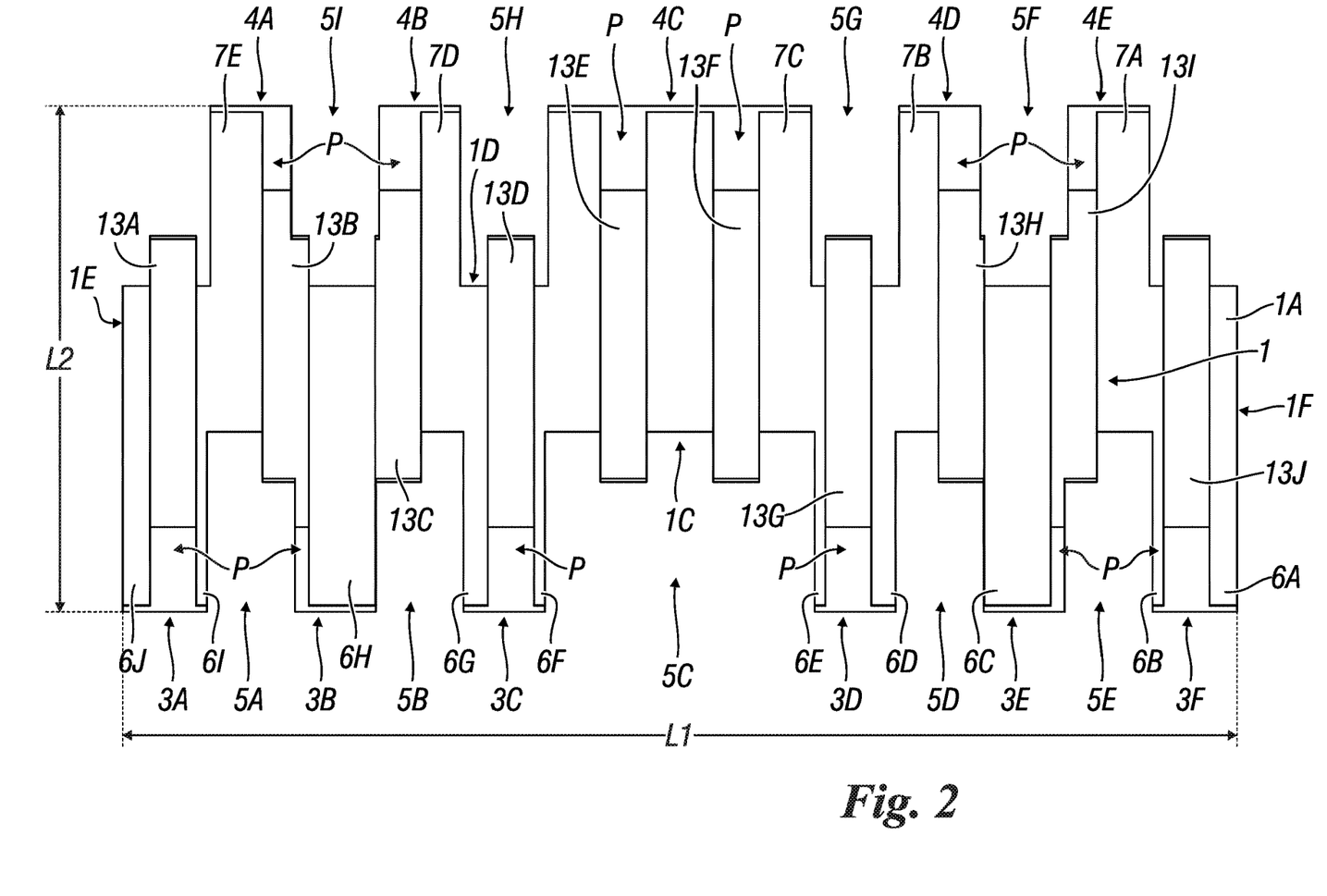
FIG. 2 is a schematic top view thereof.
Figure 7:
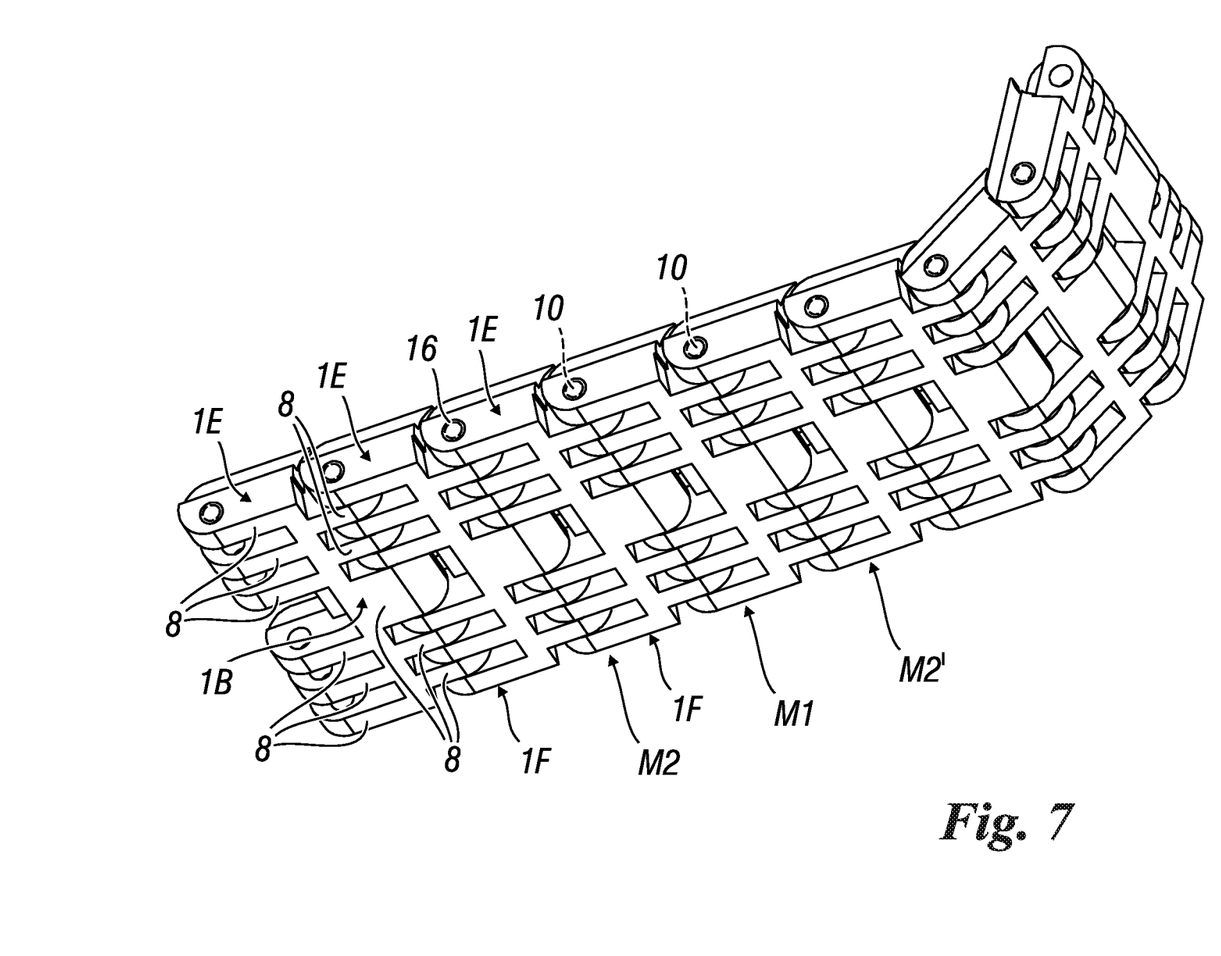
FIG. 7 is a perspective bottom view of a portion of a conveyor belt built up from the modules of FIGS. 1-4.
Figure 8:
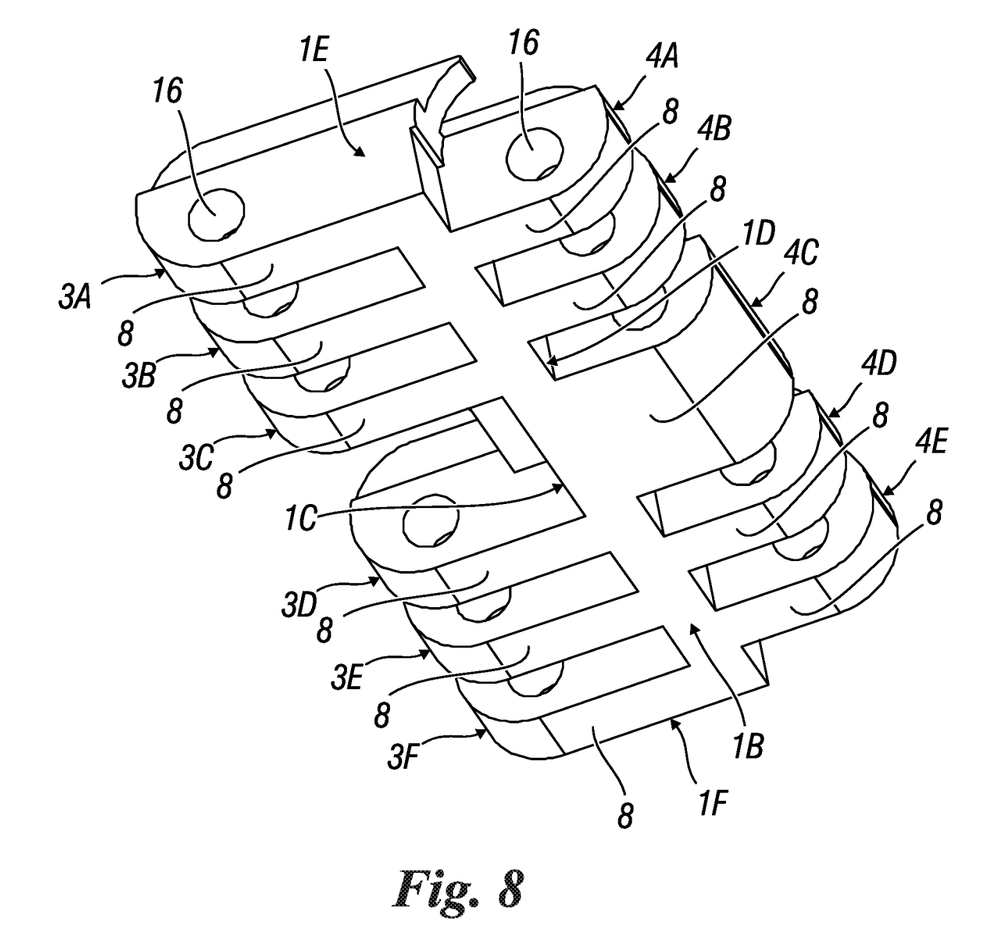
FIG. 8 is a perspective bottom view of the module of FIG. 1.

With reference to the mentioned figures, they show a module for a modular conveyor belt, comprising: a base element 1 (FIGS. 1, 2) which comprises: a first upper surface 1A (FIG. 2), a lower flat sliding surface 1B (FIGS. 7, 8) for cooperation with a flat transport path 2, a front edge 10 and a rear edge 1D parallel to each other (spaced apart by a portion L2 (FIG. 2) which also delimits the length of the module) and lateral edges 1E, 1F parallel to each other and spaced apart by a portion L1 which also delimits the width of the module), and, seen in a transport direction D (FIG. 1), a plurality of front 3A-F and rear 4A-E coupling elements for coupling the modules together, separated from each other by front 5A-D and rear 5F-I spaces (FIG. 2).

The lower flat sliding surface 1B extends from one to the other of said lateral edges 1E, 1F.

The front and rear coupling elements 3A-F and 4A-E are distributed along the entire width L1 (FIG. 2) oriented perpendicularly to the transport direction D of said front 1C and rear 1D edges.

The front and rear coupling elements 3A-F and 4A-E comprise: an upper portion 6A-J, 7A-E, and an additional lower flat sliding surface 8 (FIGS. 7 and 8) for cooperation with said flat transport path 2, and through holes 16.

The additional lower flat sliding surface 8 of the front and rear coupling elements 3A-F and 4A-E joins and is coplanar with the lower flat sliding surface 1B of the base element 1 to form a single flat sliding surface which extends from one to the other of said lateral edges 1E, 1F, for cooperation with said flat transport path 2.

Figure 3:
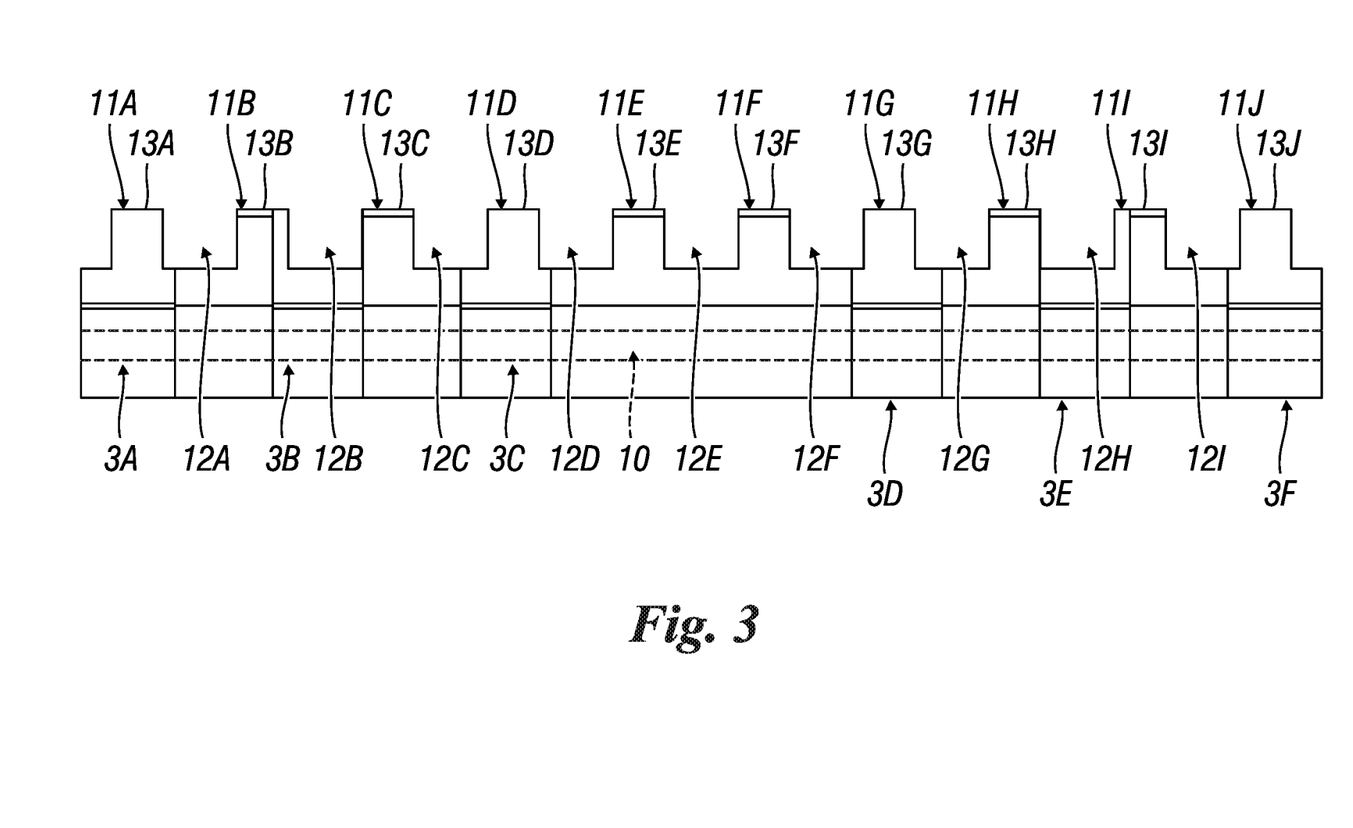
FIG. 3 is a schematic front view (with respect to FIG. 1) thereof.

The coupling elements 3A-F and 4A-4E are shaped and arranged in such a way that the front coupling elements 3A-F of a module M1 (FIG. 5) fit into the rear spaces 5F-I provided between the rear coupling elements 4A-4E of an immediately adjacent module M2, and in such a way that a connecting pin 10 (FIG. 3) which extends transversely to the transport direction D can be fit into said through holes 16 of the coupling elements 3A-F and 4A-4E of the two modules, hinging them together, and allowing the adjacent modules to at least partially rotate. The through holes 16 have a centre C1, C2 (FIG. 4) provided at a first vertical distance E1 from the lower sliding surface 8 of the coupling elements 3A-F and 4A-4E.

The coupling elements 3A-F and 4A-4E also comprise outermost convex surfaces (FIG. 4) which in turn comprise, when seen from the side (FIG. 4), at least one circular arc-shaped portion S1, S2, with the centres F1, F2 of these circular arcs which are at the same vertical distance E5 from the lower surface 8 of said rear 3A-F and front 4A-4E projecting elements and at the same horizontal distance E7 from the outermost portion S3 of said rear 3A-F and front 4A-4E projecting elements.

The module also comprises a plurality of raised elements 11A-J, at least one part of which departing from the first upper surface 1A of the base element 1 and/or from the upper portions 6A-J, 7A-E of the coupling elements 3A-F and 4A-4E, and a plurality of recesses 12A-I (FIG. 1) which separate said raised elements 11A-J.

The raised elements 11A-J each have an upper bearing surface 13A-J, which define a surface for transporting the products; these upper bearing surfaces 13A-J of the raised elements are provided, at least at the coupling elements, at a second maximum vertical distance E2 (FIG. 4) from said second lower sliding surface 8 of the coupling elements 3A-F and 4A-4E.

The upper bearing surface 13A-J of the raised elements 11A-J are provided, at least at the coupling elements 3A-F and 4A-4E, at a third maximum vertical distance E3 from said upper portion 6A-J, 7A-E of the coupling elements.

According to the invention, the difference between: the vertical distance E5 of the centres F1 and F2 of the circular arc-shaped portions of the outermost convex surfaces of the rear and front projecting elements 3A-F, 4A-4E, and the vertical distance E1 of the centres of the holes 16 for the pins 10 of the rear and front projecting elements 3A-F, 4A-4E, is greater than or equal to 1 mm, that is to say: (E5-E1)>=1 mm.

Thanks to this particular positioning of the through holes, a module can be built up which has excellent stress resistance characteristics, in particular in its most stressed area, that is to say in the area where the pin 16 is provided, and at the same time enhances the rotation of the modules when they are associated to each other to form a belt (FIG. 5), and in particular enhances the flexion of the "back flex" type belt.

According to a preferred embodiment of the invention, at least some of the raised elements 11A-J have portions P (FIG. 2) which also extend above the rear and front 3A-F, 4A-4E projecting elements and have outermost convex surfaces (FIG. 4) which in turn comprise, when seen from the side (FIG. 4), at least one circular arc-shaped portion S4, S5, with the centres F1, F2 of these circular arcs coinciding with the centres F1, F2 of the circular arc-shaped portions S1, S2, of the projecting elements from which said raised elements depart, so as to form a circular arc-shaped common and continuous outermost convex surface between said at least some projecting elements and the corresponding raised elements.

According to a preferred embodiment of the invention, the difference between half of the second vertical distance E2 of the raised elements 11A-J and the first vertical distance E1 of the through holes 16 is greater than 1 mm, that is to say:

(E2/2−E1)>=1 mm.

According to a preferred embodiment of the invention, the difference between half of said second vertical distance E2 of the raised elements and the first vertical distance E1 of the through holes is between half of said third vertical distance E3 of the raised elements increased or decreased by 20%, that is to say:

(E3/2−20% E3/2)<=(E2/2−E1)<=(E3/2+20% E3/2), more preferably the difference between half of said second vertical distance E2 of the raised elements and the first vertical distance E1 of the through holes is between half of said third vertical distance E3 of the raised elements increased or decreased by 5%, that is to say:

(E3/2−5% E3/2)<=(E2/2−E1)<=(E3/2+5% E3/2).

According to a preferred embodiment, the difference between the vertical distance E5 of the centres F1 and F2 of the outermost surfaces of the rear and front projecting elements 3A-F, 4A-4E, and the vertical distance E1 of the centres of the holes 16 for the pins 10 of the rear and front projecting elements 3A-F, 4A-4E, is between 30% and 80% of the maximum vertical distance E3 of the upper bearing surface 13A-J of the raised elements 11A-J, that is to say: 30% E3<=(E5−E1)<=70% E3 and even more preferably (E5−E1) is approximately equal to half of E3 (where "approximately" means a difference of +/−5%).

It should be noted that, as usual for modules of the type described so far, the spaces 5A-I between one projecting element and the other of a first side of the module have concave surfaces having a shape and conformation complementary to that of the external convex surfaces of the projecting elements (in particular the radius of curvature is substantially equal or slightly greater, for example greater than a value between 1% and 5%) provided on the other side of the module, so that the concave external surfaces of a module, when the belt is flexed, can rotate at least partially in contact with and/or can rotate slightly spaced from the corresponding concave surfaces of the spaces 5A-I, provided in the immediately adjacent modules.

Advantageously, at least some of the raised elements 11A-J have parts K (FIGS. 1 and 2) which have outermost concave surfaces (FIG. 4) which in turn comprise, when seen from the side (FIG. 4), at least one circular arc-shaped portion and with the centres F1, F2 of these circular arcs coinciding with the centres F1, F2 of the circular arc-shaped portions S1, S2 of the projecting elements, so as to form an outermost concave surface for rotation of the corresponding convex surfaces of the projecting elements of the adjacent modules.

According to a preferred embodiment, the centres F1, F2 of the circular arc-shaped portions S1, S2 of the rear 3A-F and front 4A-4E projecting elements, and the centres F1, F2 of the circular arc-shaped portions of the parts K (FIG. 4) which have outermost concave surfaces of the raised elements 11A-J, all lie in an intermediate plane of the module, that is to say in a plane that divides the module into two parts having the same height H5 (FIG. 4) and H6.

Figure 4:
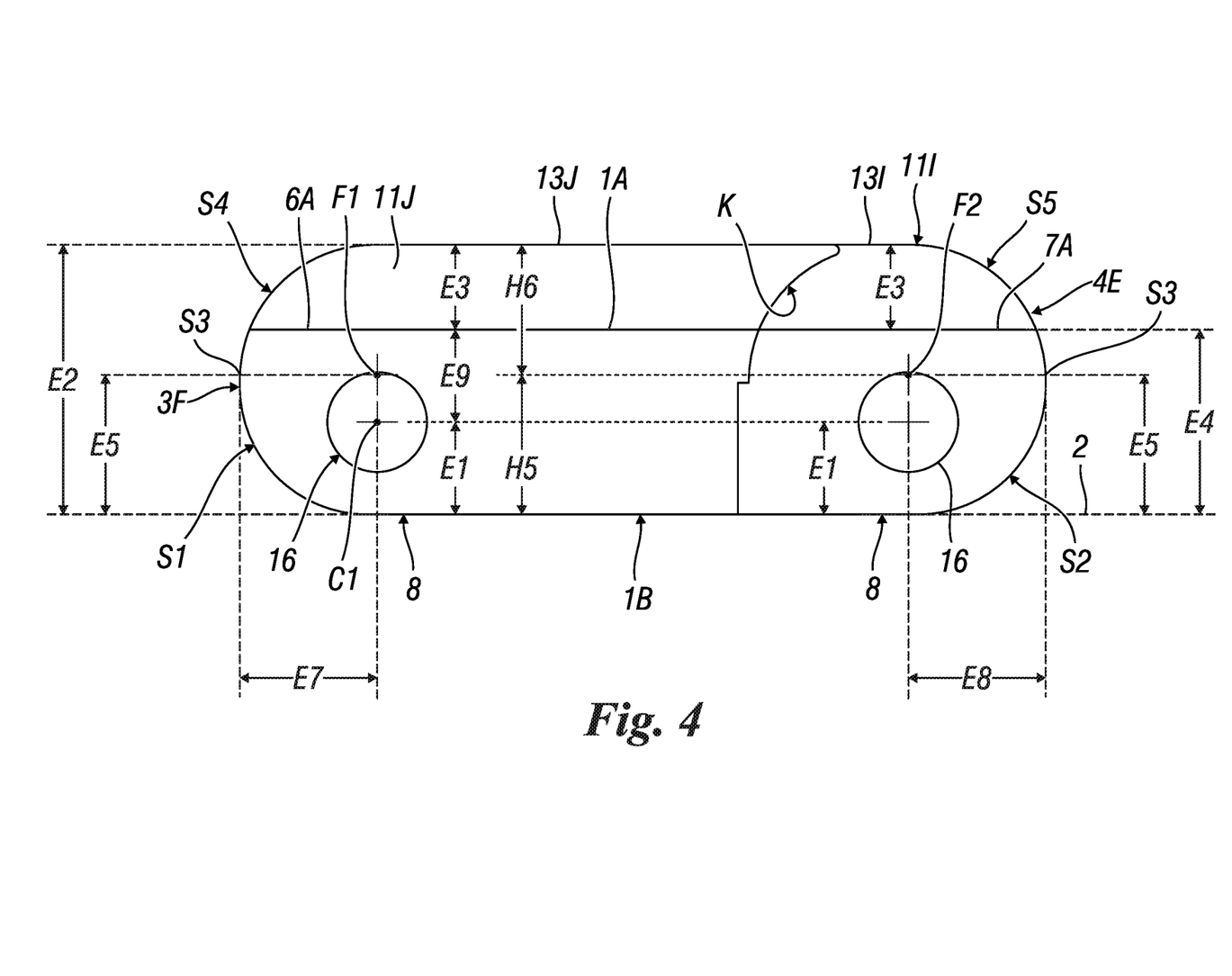
FIG. 4 is a right side view (with respect to FIG. 1) thereof.

According to a preferred embodiment, the centre C1, C2 of the through holes 16 is equidistant with respect to the lower surface 8 and the upper portions 6A-6J and 7A-7E of the coupling elements 3A-F and 4A-4E, that is to say, with reference to FIG. 4: E1=E9.

According to a preferred embodiment, the thickness E4 of the base element is greater than the maximum vertical distance E3 of the raised elements 11A-J from the upper surface 1A of said base element, more preferably the maximum vertical distance E3 is between 30% and 70% of the thickness E4, more preferably is between 40% and 50% of the thickness E4.

The raised elements have the shape and orientation usual for the person skilled in the art, for example they are rectilinear and oriented parallel to the belt movement direction D (FIG. 1) (as shown in FIGS. 1-5) or they can have an extension wholly or partly inclined to this direction D.

The module is made of one or more plastic materials usual for the person skilled in the art.

The pins 10 are of the usual type for the person skilled in the art and have for example a diameter between 3 mm and 5 mm, preferably equal to 4 mm.

Figure 5:
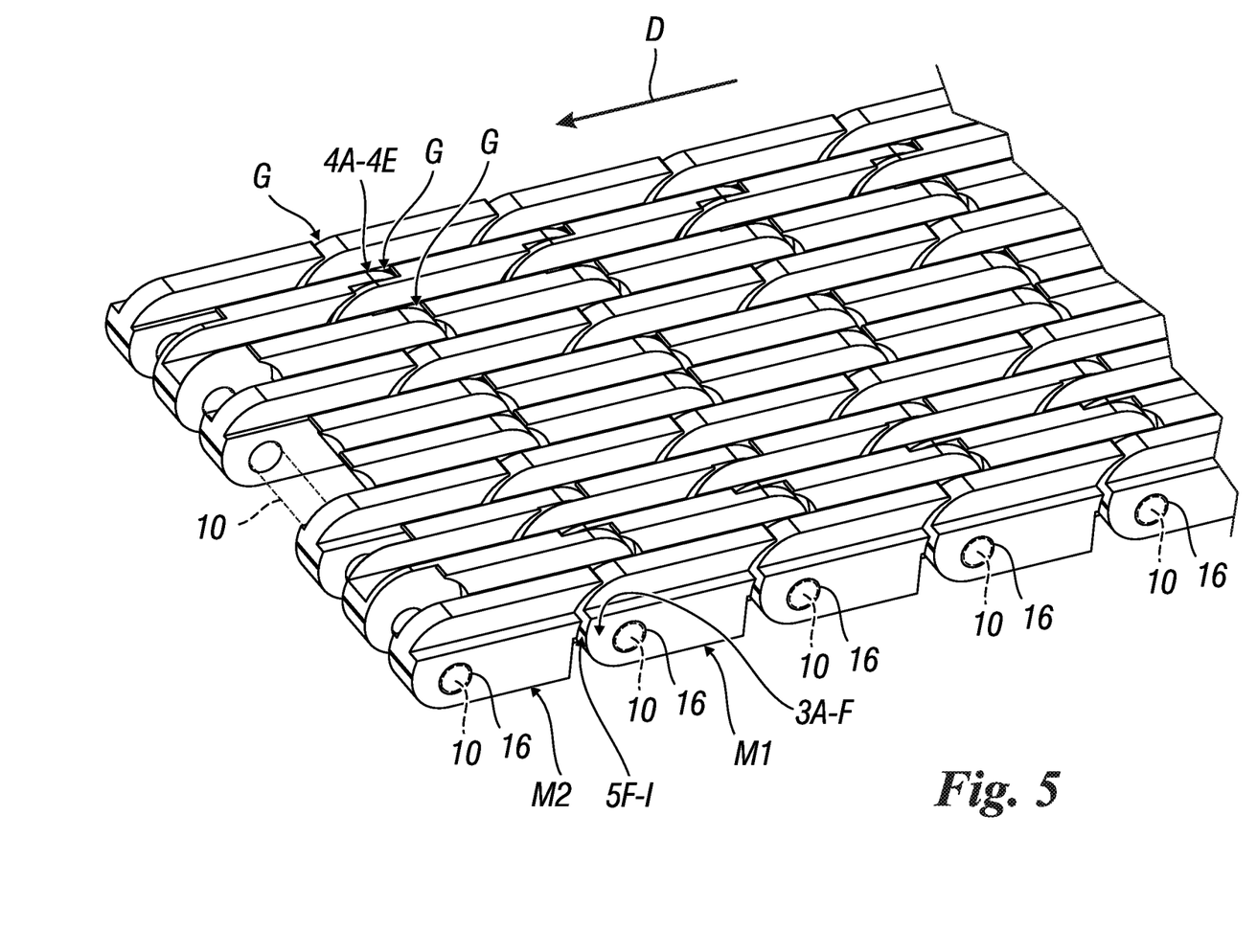
FIG. 5 is a schematic perspective top view of a portion of a conveyor belt built up from the modules of FIGS. 1-4.
Figure 6:
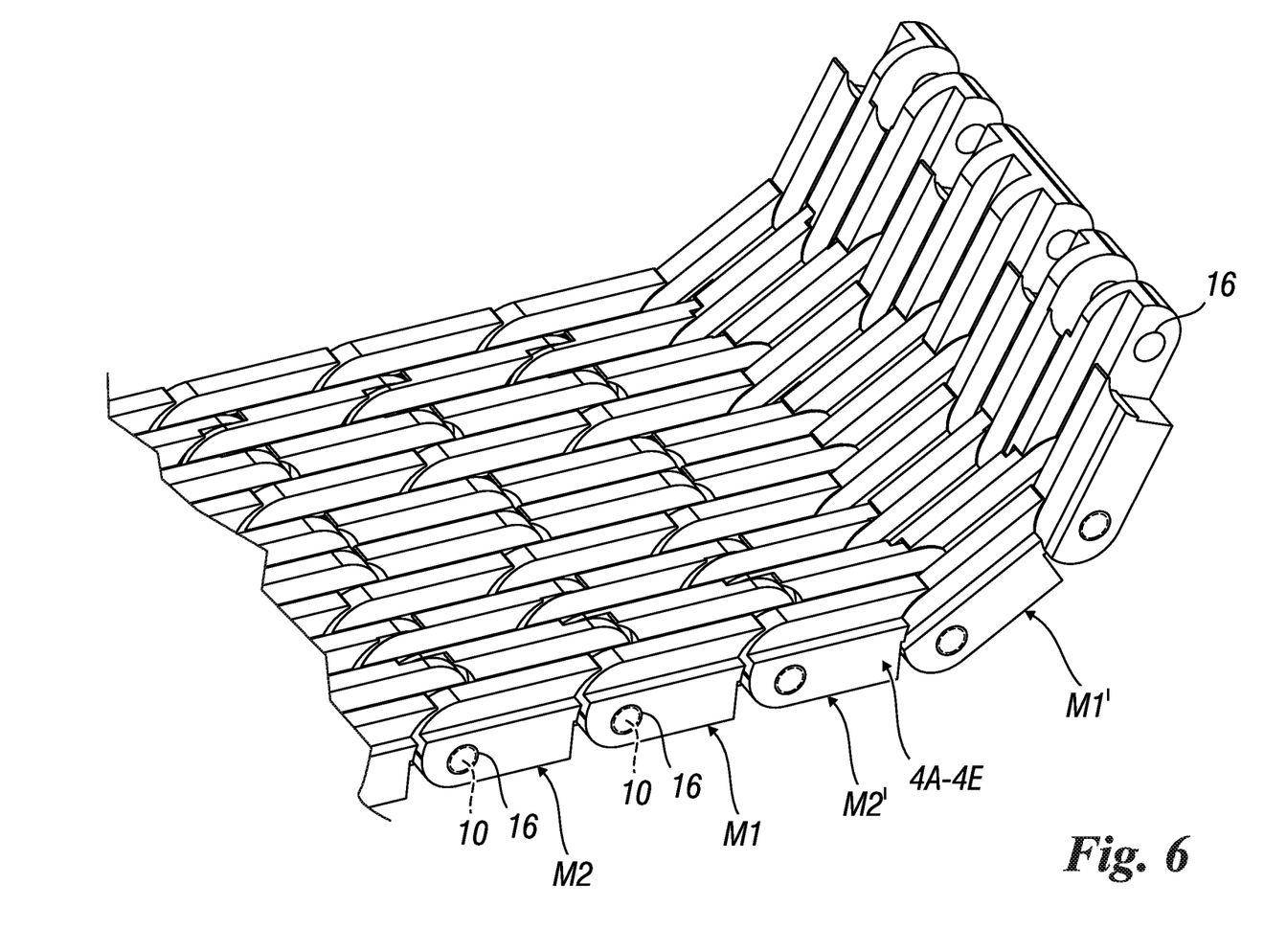
FIG. 6 is a schematic perspective top view of a portion of the conveyor belt of FIG. 5 in which one part thereof is bent in the "back flex" position.

FIGS. 5 and 6 show a plurality of modules of the type described so far joined together by pins 10 so as to form a belt conveyor. It should be noted that thanks to the particular positioning of the centres C1, C2 of the holes 16 for the pins 10 and of the centres F1, F2 of the outermost surfaces of the projecting elements 3A-F, 4A-4E, it is possible to built up a belt:

a) wherein the raised elements 11A-J can form upper bearing surfaces 13A-J for the products to be transported, which are substantially continuous, that is with slits G between a bearing surface and the immediately following one of extremely small dimensions, for example between 0.5 mm and 3 mm, more preferably equal to approximately 1 mm, so as to form substantially continuous surfaces (as shown in FIG. 5);

b) and the belt modules can be rotated so that the belt can flex in the "back flex" position (as shown in FIG. 6).

It should be reiterated, ultimately, that the embodiments illustrated so far have been provided by way of example and that numerous variants are possible falling within the same inventive concept, so for example the shape and/or orientation of the raised elements 11A-J could be different from the one illustrated so far. The same also applies to the shape of the projecting elements 3A-F, 4A-4E and the spaces 5A-I for housing said projecting elements. It should be noted that the modules described so far and the belt built up from said modules can be moved in both the direction D, indicated so far and represented in the figures, and in the opposite direction since these belts and modules can be moved in both directions.

The invention claimed is:

1. A module for a modular conveyor belt, said module comprising:
a base element (1) which comprises:
a first upper surface (1A),
a lower flat sliding surface (1B) for cooperation with a flat conveyor path (2),
a front edge (1C) and a rear edge (1D) parallel to each other and lateral edges (1E, 1F) parallel to each other,
and, seen in a transport direction (D), a plurality of front (3A-F) and rear (4A-E) coupling elements for coupling the modules together, separated from each other by front (5A-D) and rear (5F-I) spaces;
wherein said lower flat sliding surface (1B) extends from one to the other of said lateral edges (1E, 1F),
wherein said front and rear coupling elements (3A-F; 4A-E) are distributed along the entire width (L1) of said front (1C) and rear (1D) edges,
wherein said front and rear coupling elements (3A-F) and (4A-4E) comprise:
an upper portion (6A-J), (7A-E)
and an additional lower flat sliding surface (8) for cooperation with said flat transport path (2), and through holes (16),
wherein said additional lower flat sliding surface (8) of said front and rear coupling elements (3A-F; 4A-4E) joins and is coplanar with the lower flat sliding surface (1B) of the base element (1) to form a single flat sliding surface which extends from one to the other of said lateral edges (1E, 1F), for cooperation with said flat transport path (2),
wherein said coupling elements (3A-F) and (4A-4E) are adapted to fit the front coupling elements (3A-F) of a module (M1) into the rear spaces (5F-I) provided between the rear coupling elements (4A-4E) of an immediately adjacent module (M2), and a connecting pin (10) extending transversely to the transport direction (D) is inserted in said through holes (16) of the coupling elements (3A-F) and (4A-4E) of the two modules, hinging them together, and allowing the adjacent modules to at least partially rotate;
wherein the through holes (16) have a center (C1), (C2) provided at a first vertical distance (E1) from the lower sliding surface (8) of the coupling elements (3A-F) and (4A-4E);
wherein an outermost convex surfaces of the rear (3A-F) and front (4A-4E) coupling elements have a circular arc shape, with the centers (F1), (F2) of these circular arcs which are at a same vertical distance (E5) from the lower surface (8) of said rear (3A-F) and front (4A-4E) projecting elements and at a same horizontal distance (E7) from the outermost portion (S3) of said rear (3A-F) and front (4A-4E) projecting elements;
and a plurality of raised elements (11A-J), at least one part of which departing from the first upper surface (1A) of the base element (1) or from the upper portions (6A-J), (7A-E) of the coupling elements (3A-F) and (4A-4E), and a plurality of recesses (12A-I) (FIG. 1) which separate said raised elements (11A-J);
wherein said raised elements (11A-J) each have an upper bearing surface (13A-J), which forms a surface for transporting the products;
wherein said upper bearing surfaces (13A-J) of the raised elements are provided, at least at the coupling elements, at a second maximum vertical distance (E2) from said second lower sliding surface (8) of the coupling elements (3A-F) and (4A-4E);
wherein said upper bearing surfaces (13A-J) of the raised elements (11A-J) are provided, at least at the coupling elements (3A-F) and (4A-4E), at a third maximum vertical distance (E3) from said upper portion (6A-J) and (7A-E) of the coupling elements;
wherein the difference between the vertical distance (E5) of the centers (F1) and (F2) of the circular arc-shaped outermost convex surfaces of the rear and front projecting elements (3A-F) (4A-4E), and the vertical distance (E1) of the centers of the holes (16) for the pins (10) of the rear and front projecting elements (3A-F), (4A-4E), is greater than or equal to 1 mm.

2. The module for a modular conveyor belt according to claim 1, characterized in that the difference between half the second maximum vertical distance (E2) of the raised elements (11A-J) and the first vertical distance (E1) of the through holes (16) is greater than 1 mm.

3. The module for a modular conveyor belt according to claim 2, characterized in that the difference between half said second vertical distance (E2) of the raised elements and the first vertical distance (E1) of the through holes is between half said third maximum vertical distance (E3) of the raised elements increased or decreased by 20%.

4. The module for a modular conveyor belt according to claim 3, wherein the difference between half said second vertical distance (E2) of the raised elements and the first vertical distance (E1) of the through holes is between half said third maximum vertical distance (E3) of the raised elements increased or decreased by 5%.

5. The module for a modular conveyor belt according to claim 1, characterized in that the difference between the vertical distances (E5) of the centers (F1) and (F2) of the outermost surfaces (S1), (S2) of the rear and front projecting elements (3A-F), (4A-4E), and the vertical distance (E1) of the centers of the holes (16) for the pins (10) of the rear and front projecting elements (3A-F), (4A-4E), is between 30% and 70% of the maximum vertical distance (E3) of the upper bearing surfaces (13A-J) of the raised elements (11A-J).

6. The module for a modular conveyor belt according to claim 5, wherein the difference between the vertical distances (E5) of the centers (F1) and (F2) of the outermost surfaces of the rear and front projecting elements (3A-F), (4A-4E) and the vertical distance (E1) of the centers of the holes (16) for the pins (10) of the rear and front projecting elements (3A-F), (4A-4E) is between 45% and 55% of the maximum vertical distance (E3) of the upper bearing surfaces (13A-J) of the raised elements (11A-J).

7. The module for a modular conveyor belt according to claim 1, characterized in that the center (C1), (C2) of the through holes (16) is equidistant with respect to the lower surface (8) and the upper portions (6A-6J) and (7A-E) of the coupling elements (3A-F; 4A-4E).

8. The module for a modular conveyor belt according to claim 1, characterized in that the thickness (E4) of the base element (1) is greater than the maximum vertical distance (E3) of the raised elements (1A-J) from the upper surface (1A) of said base element.

9. The module for a modular conveyor belt according to claim 8, wherein the maximum vertical distance (E3) is between 30% and 70% of the thickness (E4).

10. The module for a modular conveyor belt according to claim 1, characterized in that at least some of the raised elements (11A-J) have portions (P) which also extend above the rear and front (3A-F; 4A-4E) projecting elements, and which have outermost convex surfaces which in turn comprise at least one circular arc-shaped portion (S4, S5), with the centers (F1, F2) of these circular arcs coinciding with the centers (F1, F2) of the circular arc-shaped portions (S1, S2), of the projecting elements from which said raised elements depart, so as to form a circular arc-shaped common and continuous outermost convex surface between said at least some projecting elements and the corresponding raised elements.

11. The module for a modular conveyor belt according to claim 1, characterized in that at least some of the raised elements (11A-J) have parts (K) which have outermost concave surfaces which in turn comprise at least one circular arc-shaped portion, and with the centers (F1, F2) of these circular arcs coinciding with the centers (F1, F2) of the circular arc-shaped portions (S1, S2) of the projecting elements, so as to form an outermost concave surface for rotation of the corresponding convex surfaces of the projecting elements of the adjacent modules.

12. The module for a modular conveyor belt according to claim 1, characterized in that the centers (F1, F2) of the circular arc-shaped portions (S1, S2) of the rear (3A-F) and front (4A-4E) projecting elements, and the centers (F1, F2) of the circular arc-shaped portions of the parts (K) which have outermost concave surfaces of the raised elements (11A-J), all lie in an intermediate plane of the module, wherein a plane that divides the module into two parts has the same height (H5) and (H6).

13. A modular conveyor belt comprising a plurality of identical modules according to claim 1.

* * * * *